July 3, 1962 E. T. ASTLEY 3,042,332

SPLICING OF PREPRINTED WEBS

Filed July 5, 1961 2 Sheets-Sheet 1

Inventor
Edward T. Astley
By Kemon, Palmer, Stewart & Estabrook
Attorney

SPLICING OF PREPRINTED WEBS

Filed July 5, 1961 2 Sheets-Sheet 2

Inventor
Edward T. Astley
By Kemon, Palmer, Stewart & Estabrook
Attorneys

United States Patent Office 3,042,332
Patented July 3, 1962

3,042,332

SPLICING OF PREPRINTED WEBS

Edward Thomas Astley, London, England, assignor to J. F. Crosfield Limited

Filed July 5, 1961, Ser. No. 121,902
Claims priority, application Great Britain July 4, 1960
4 Claims. (Cl. 242—58.3)

Figure 1:
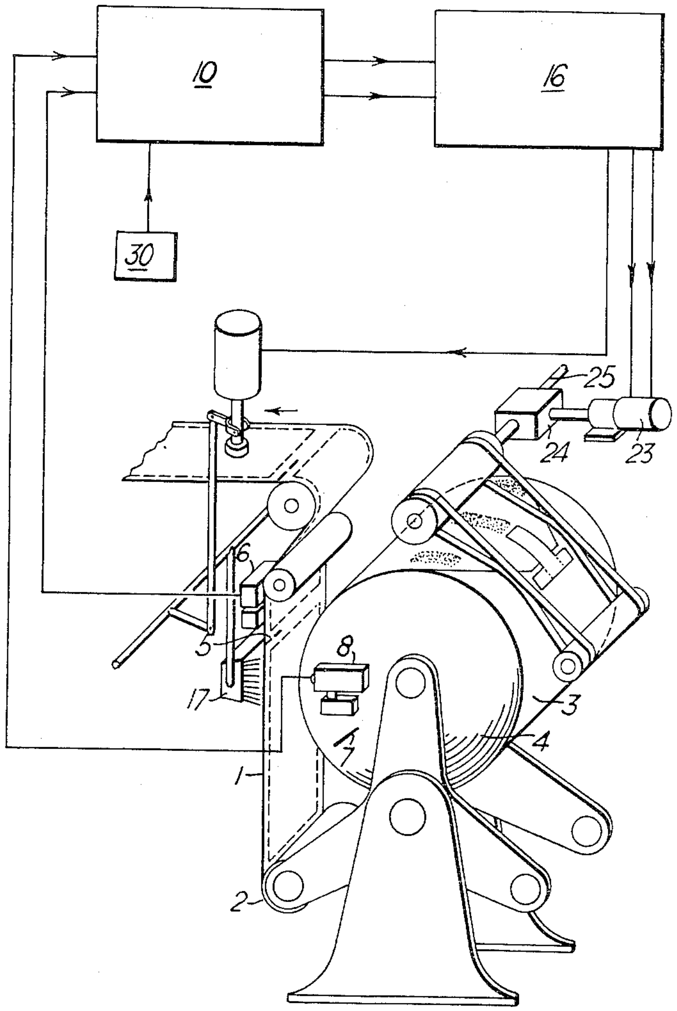

This invention relates to joining successive webs of preprinted material and more particularly to methods of ensuring that the webs are in good register at the point where the join is made.

According to the present invention, apparatus for sticking a moving web of paper carrying a repeated pattern to a rotating reel of paper carrying a corresponding pattern comprises control means including a register determining device receiving signals representing the passage of patterns on the reel and on the moving web past predetermined points and operative to cause the sticking when the interval between the signals representing the passage of patterns on the web and the reel indicates that the patterns on the attached webs will be substantially in register, means operable to vary the relative speed of the web and the new reel to vary the rate of change of register between them and means preventing the operation of the speed-varying means until a predetermined time has passed since the commencement of the search for an in-register condition of the web and reel without the operation of the register-determining means. The search for an in-register condition can be initiated either manually or automatically. The said time can be measured by counting the number of revolutions of the reel, the speed of the rotating reel being adjusted if no suitable correspondence is found within a predetermined number of revolutions. Preferably means are provided for stopping the apparatus if no correspondence is found within a further predetermined number of revolutions after the speed has been adjusted.

In known automatic pasters it has been the practice to attempt to bring a new reel of paper into register with an expiring web by adjusting the speed of the new reel. In the apparatus according to the present invention no adjustment is made to this speed in normal circumstances, the principle being that the relative register of the two webs will change on each reel revolution by an amount determined by the reel circumference and the length of the repeated pattern. The patterns on the two webs will consequently come into register in time, of their own accord, without requiring any outside control. A signal is produced when the webs are approaching this in-register condition so that the paster may operate when it is reached to join the two webs. If no such correspondence is obtained after, say, twenty-three revolutions of the new reel, it is evident that the change in register between the two webs is inconveniently slow and the speed of the new reel is then altered by, for example, one percent to increase the speed of this register change. If a point of good register is still not obtained means are provided for stopping the machine before the web on the expiring reel is completely exhausted.

Should the new reel circumference be an exact number of patterns, and should the peripheral speed of the reel be exactly that of the expiring web, there will be zero register change between the two webs, and therefore they will never fall into correspondence. However, the alteration of reel speed will introduce a register change, thus causing correspondence on some future reel revolution.

Figure 2:
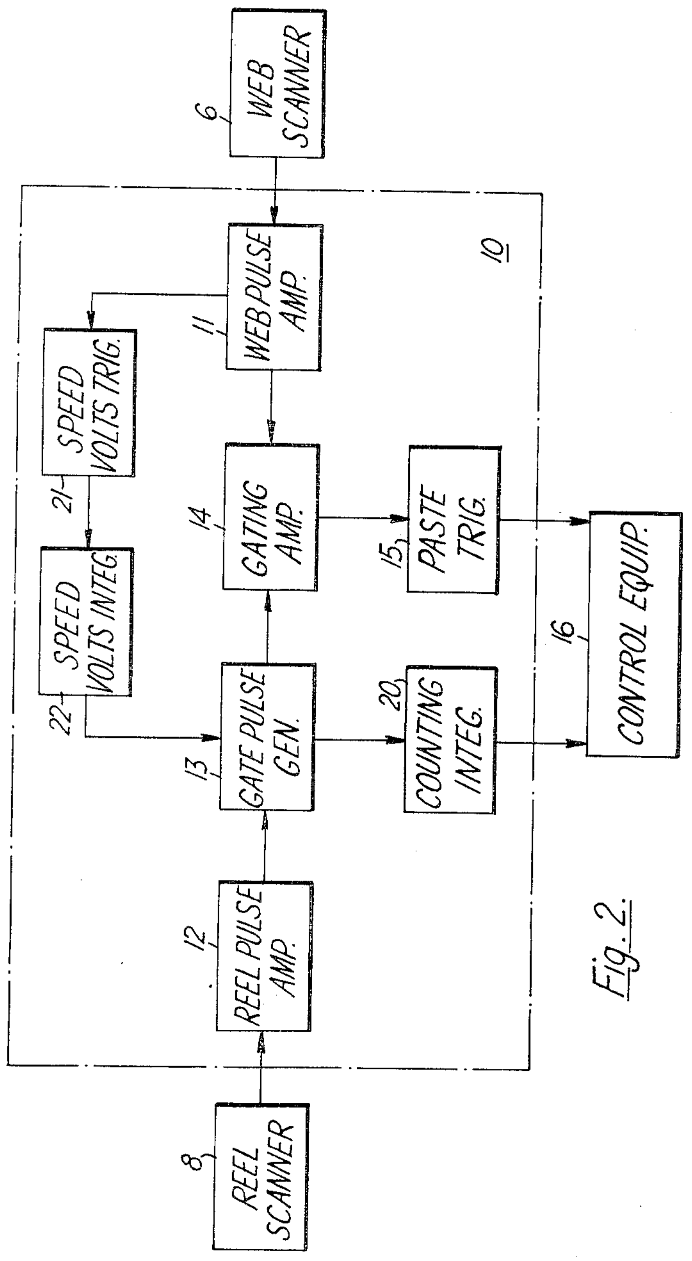

A control apparatus embodying the present invention is suitable for use with known automatic pasting mechanisms and in order that the invention may be more clearly understood a specific example of such an apparatus used in conjunction with the pasting mechanism described in the U.S. Patent No. 2,899,143 owned by the same assignee as the present application will now be described by way of example with reference to the accompanying drawings, in which:

FIGURE 1 shows the general arrangement of the reel-stand and the equipment for sensing a register condition and instituting a pasting operation; and FIGURE 2 is a block diagram showing the relationship of the various units included in the control unit of FIGURE 1.

It is required to paste a moving web 1 from an expiring reel 2 to the web 3 on a new reel 4 in such a way that the printed units on the two webs fall into register. The search for an "in-register" position is initiated either manually by operation of a push-button 30 or automatically by means of a photoelectric scanner, for example, which generates a signal when, say, the diameter of the expiring reel 2 reaches a given value. When only the required length of paper is left on the expiring reel the reel-stand is first rotated through 120° to assume the position shown in FIGURE 1 with the expiring reel 2 below the new reel and the register search now to be described is initiated.

Register marks 5 are printed on the expiring web 1 corresponding to a predetermined position on each pattern unit, and these marks are detected by a photoelectric device 6. The new reel 4 has a register mark 7 which is placed on it by the machine operator, and which may be, for example, in black crayon on the side or periphery of the reel, for detection by a photoelectric device. The peripheral speed of the new reel 4 is adjusted to within about 2 percent of that of the expiring web 1, and the electric signals derived when the register marks 5 and 7 pass the sensing devices 6 and 8 are fed into the control unit 10 through amplifiers 11 and 12 respectively. The amplified signal derived from the sensing of the register marks 5 on the expiring web 1 is fed to the speed-volts trigger circuit 21, which is a pulse-shaping circuit, which supplies a positive-going square pulse to a speed-volts integrator 22 for each input signal which it receives. The speed-volts integrator circuit 22 essentially comprises an integrating capacitor connected between a fixed potential and the grid of a triode. The positive-going square input signals from the trigger circuit 21 are applied to the junction of the valve grid and the integrating capacitor through an input capacitor and a rectifier so that it appears at this point as a pulse with a steep positive-going edge followed by exponential decay. A discharge resistor is connected across the integrating capacitor. The first input signal from the trigger circuit 21 charges the integrating capacitor instantaneously substantially up to its full value and the voltage accumulated then falls as a current flows through the discharge resistor until another input pulse is received. Only a small portion of this second pulse is passed by the rectifier since the rectifier is biased against conduction by the voltage remaining on the integrating capacitor. Since the amount by which the capacitor has discharged depends on the time constant of the integrating capacitor-resistor network and the interval between successive pulses, the magnitude of the voltage signal applied to the grid of the triode also depends inversely on the interval between the pulses and therefore depends directly on the frequency of the pulses from the expiring web scanner 6 and the speed of the expiring web 1. The output of the speed-volts integrator 22 is taken from the cathode of the triode and it is arranged that this output voltage signal has a fixed value when the frequency of pulses received by the speed-volts integrator from the web scanner 6 is zero and that it increases substantially proportionally with the input signal it receives at its grid, and consequently substantially proportionally with the speed of the expiring web.

This output voltage signal from the speed-volts integrator 22 is fed to a gate pulse generator 13 which also receives a pulsed signal from the reel scanner 8 via the reel pulse amplifier 12, the frequency of which is dependent on the speed of revolution of the new reel. The gate pulse generator 13 generates a gating pulse each time it receives a pulse from the reel scanner 8 and the voltage signal from the speed-volts integrator 22 is used to adjust the duration of the gating pulse so that it is inversely proportional to the speed of the expiring web. Thus the time for which the gate waveform is present represents a certain length of paper. The output from the gate pulse generator 13 is fed to a gating amplifier 14 which also receives pulses from the web pulse amplifier 11 and if a pulse from the pulse amplifier 11 is received by the gating amplifier 14 within the time occupied by this gating pulse the register is sufficiently good for a paste to be made and an output signal is applied to the paste trigger circuit 15 which, in turn, applies a signal to the control equipment 16 to initiate the operation of the automatic paster 17 (FIGURE 1) followed by the operation of a knife (not shown) to cut the expiring web. The apparatus thus detects when the two signals are separated by less than a predetermined time interval, which is dependent on the speed of movement of the web (i.e. it detects when the register error, on pasting, will be less than a predetermined amount), and when such a correspondence condition is detected causes the paster to operate.

Depending upon the circumference of the new reel 4, the web and reel pulse may coincide after a few revolutions of the new reel 4, after a great many revolutions, or in the worst case, not at all. This applies if the circumference of the new reel is equal to a definite number of patterns in the expiring web and if both webs are moving effectively at exactly the same speed. However, if the new reel circumference is not a definite number of patterns or does not run at the same speed as the expiring reel when it is a definite number of patterns, then the register difference between reel and web pulses will change on each reel revolution. If the paste has not taken place within a given number of reel revolutions, the required correspondence of gate waveforms and web pulse may be hastened by changing the reel speed, for example by means of a correction motor acting through differential gearing. This is arranged by applying the output of the gate pulse generator 13 to a counting integrator 20 which applies a signal to the control equipment 16 for changing the speed of the new reel by means of the motor 23 which applies a correction through differential gearing 24 to the speed of the shaft 25 from the main press driving motor which drives the new reel 4. Should the paste not take place during a second count of the given reel revolutions a signal is transmitted from the counting integrator 20 to the control equipment 16 to cause the printing machine to stop.

Alternatively in reel stands in which the new reel is driven from the printing machine through an electromagnetic clutch, the variation of the speed of the new reel when a given number of revolutions have occurred without register may be effected by momentarily deenergising the clutch.

If the pasting mechanism requires one reel revolution in which to operate, for example, the equipment must sense good register one revolution before the instant of pasting. This is allowed for by displacing the reel register mark 7 around the reel 4 to such an extent that the register change which takes place during the pasting revolution is cancelled out. When the speed of the new reel is changed by the control equipment the register change in the last revolution before pasting (after the signal for the operation of the pasting mechanism), also changes. In most cases the register error which is introduced in this manner is negligible. If a more exact register is required a correction can be introduced to the time when the register mark 7 on the new reel is effectively sensed, when the speed of rotation of the new reel has been changed. For example, if the speed of the new reel is changed in such a manner that the register change per revolution is increased, a correction must be introduced, the effect of which is to increase the displacement of the mark on the reel in a direction opposite to the direction of rotation of the reel, or to provide a displacement of the register mark on the expiring web in the direction of movement of the web, and this effect is simulated by means of an electronic delay circuit through which the pulses due to the expiring web are passed.

I claim:

1. Apparatus for sticking a moving web of paper carrying a repeated pattern to a rotating reel of paper carrying a corresponding pattern comprising: control means including a register determining device receiving signals representing the passage of patterns on the reel and on the moving web past predetermined points and operative to cause the sticking when the interval between the signals representiing the passage of patterns on the web and the reel indicates that the patterns on the attached webs will be subtantially in register; means operable to vary the relative speed of the web and the new reel by a given amount which is independent of the register error to vary the rate of change of register between them; and means preventing the operation of the speed-varying means until a predetermined time has passed since the commencement of the search for an in-register condition of the web and reel without the operation of the register-determining means.

2. Apparatus according to claim 1 including means for stopping the moving web if the register determining means has not operated after a further predetermined time after the relative speed of the moving web and the rotating reel has been adjusted.

3. Apparatus according to claim 1 in which signals representing the passage of patterns on either the reel or the web are used to open an electronic gate included in the register-determining means for a predetermined interval and the sticking operation is initiated if a signal representing the passage of patterns on the other pattern-carrying component, either the web or reel respectively, is received by the register-determining means while the electronic gate is open.

4. Apparatus according to claim 3 in which the time interval for which the electronic gate is open after the reception of a signal representing the passage of a pattern on one pattern-carrying component by the register-determining means is dependent on the frequency of pattern-representing signals from the other pattern-carrying component.

References Cited in the file of this patent

UNITED STATES PATENTS

| | | |
|---|---|---|
| 2,212,821 | Horton | Aug. 27, 1940 |
| 2,536,153 | Bishop | Jan. 2, 1951 |
| 2,621,865 | Wieking | Dec. 16, 1952 |
| 2,899,143 | Crosfield et al. | Aug. 11, 1959 |

FOREIGN PATENTS

| | | |
|---|---|---|
| 798,330 | Great Britain | July 16, 1958 |